(12) United States Patent
Nachyła

(10) Patent No.: US 12,100,940 B2
(45) Date of Patent: Sep. 24, 2024

(54) DEVICE FOR FIXING MEASURING DEVICES PERPENDICULARLY ON OVERHEAD LINEAR OBJECTS, ESPECIALLY ON OVERHEAD POWER TRANSMISSION LINES

(71) Applicant: Dariusz Nachyła, Bielawa (PL)

(72) Inventor: Dariusz Nachyła, Bielawa (PL)

( * ) Notice: Subject to any disclaimer, the term of this patent is extended or adjusted under 35 U.S.C. 154(b) by 801 days.

(21) Appl. No.: 16/978,636

(22) PCT Filed: Mar. 5, 2019

(86) PCT No.: PCT/PL2019/000018
§ 371 (c)(1),
(2) Date: Sep. 4, 2020

(87) PCT Pub. No.: WO2019/172788
PCT Pub. Date: Sep. 12, 2019

(65) Prior Publication Data
US 2020/0412109 A1     Dec. 31, 2020

(30) Foreign Application Priority Data

Mar. 5, 2018   (PL) .......................................... 424761

(51) Int. Cl.
*H02G 1/02*     (2006.01)
*H02G 7/05*     (2006.01)

(52) U.S. Cl.
CPC .............. *H02G 1/02* (2013.01); *H02G 7/056* (2013.01)

(58) Field of Classification Search
CPC .......... H02G 1/02; H02G 7/053; H02G 7/056; H02G 7/12; H02G 7/14
See application file for complete search history.

(56) References Cited

U.S. PATENT DOCUMENTS 2,385,708 A      9/1945   Johnson
4,011,397 A  *   3/1977   Bouche ................... H02G 7/14
                                                         267/167

(Continued)

FOREIGN PATENT DOCUMENTS

CN         2850086          12/2006
DE          825565          12/1951
KR     101643358 B1    *    7/2016

OTHER PUBLICATIONS

International Search Report and Written Opinion of the International Searching Authority in PCT/PL2019/000018.

*Primary Examiner* — Dean J Kramer
(74) *Attorney, Agent, or Firm* — Soody Tronson; STLG Law Firm

(57) ABSTRACT

A device for fixing measuring devices perpendicularly on overhead linear objects, especially on overhead power transmission lines, which comprises a fastening element (1) and a swinging element (10) which are permanently connected to each other in such a way that the fastening element (1) is permanently connected to an inner cylindrical element (2) with a longitudinal assembly slot (3), on which inner cylindrical element (2) an outer cylindrical element (4) with a longitudinal assembly slot (3) is permanently pivotally mounted, whereas at one of the edges of the longitudinal assembly slot (3) of the outer cylindrical element (4), a fixing measuring element (5) is fastened, wherein a socket for mounting the measuring device is formed, preferably longitudinally, in the fixing measuring element (5).

5 Claims, 2 Drawing Sheets

(56) References Cited

U.S. PATENT DOCUMENTS

| | | | | |
|---|---|---|---|---|
| 4,381,422 A | * | 4/1983 | Traini | H02G 7/125 |
| | | | | 174/42 |
| 5,341,088 A | * | 8/1994 | Davis | H02J 13/00034 |
| | | | | 324/105 |
| 6,528,721 B1 | * | 3/2003 | Dane | H02G 7/14 |
| | | | | 174/40 R |
| 2006/0125469 A1 | | 6/2006 | Hansen | |
| 2014/0216808 A1 | | 8/2014 | Ahlisch et al. | |

* cited by examiner

DEVICE FOR FIXING MEASURING DEVICES PERPENDICULARLY ON OVERHEAD LINEAR OBJECTS, ESPECIALLY ON OVERHEAD POWER TRANSMISSION LINES

The object of the invention is a device for device for fixing measuring devices perpendicularly on overhead linear objects, especially on overhead power transmission lines, applicable in energy sector, construction or railways.

Measuring devices are known which are permanently installed on the power line in a way that allows them to hang freely, however, their installation requires switching off the power line so that the fitter could safely approach such a line.

A device for device for fixing measuring devices perpendicularly on overhead linear objects, especially on overhead power transmission lines is characterised according to the invention in that it comprises a fastening element and a swinging element which are permanently connected to each other in such a way that the fastening element is permanently connected to an inner cylindrical element with a longitudinal assembly slot, on which inner cylindrical element an outer cylindrical element with a longitudinal assembly slot is permanently pivotally mounted. At one of the edges of the longitudinal assembly slot of the outer cylindrical element, a fixing measuring element is fastened. A socket for mounting the measuring device is made, preferably longitudinally, in the fixing measuring element.

Preferably, the fixing measuring element is a measuring device.

Preferably, the fixing measuring element is pivotably fastened to the outer cylindrical element.

Preferably, motion limiters are formed at the edges of the inner cylindrical element.

Preferably, the motion limiters are in the form of flanges.

The device according to the invention comprises two parts integrally connected to each other, one of which enables permanent fastening onto the line object, and the other provides the possibility of free rotation of the device about its axis. An energy spring clamp, or screw clamp, is fixed to the fastening element, wherein it is possible to install the said clamp on live lines by means of an insulating pole with a special maneuvering hook, so-called dielectric stick, without having to turn off the voltage in the power line. Assembly slots enable suspension of the device on the power line which is located in the axis of the inner and outer cylindrical element. As the line rotates around its own axis, the inner cylindrical element rotates with the fastening element and the clamp fixed to it, whereas the outer cylindrical element together with the fixing measuring element, thanks to the rotating connection, remain under the force of gravity in its unchanged, vertical position.

The device is easy to use and can be repeatedly installed and disassembled as needed.

The invention is further explained in an embodiment in the drawing, in which

EXAMPLE I

Figure 1:
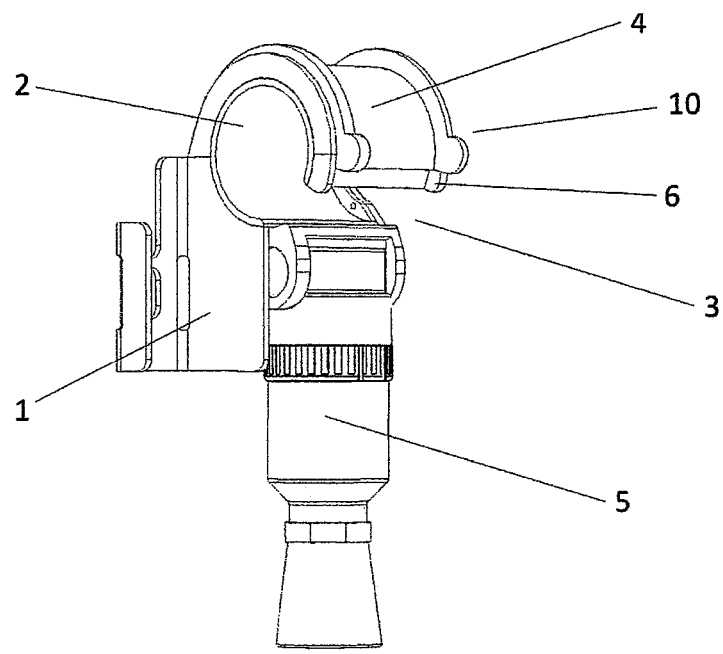
FIG. 1 shows the device in an axonometric view.
Figure 2:
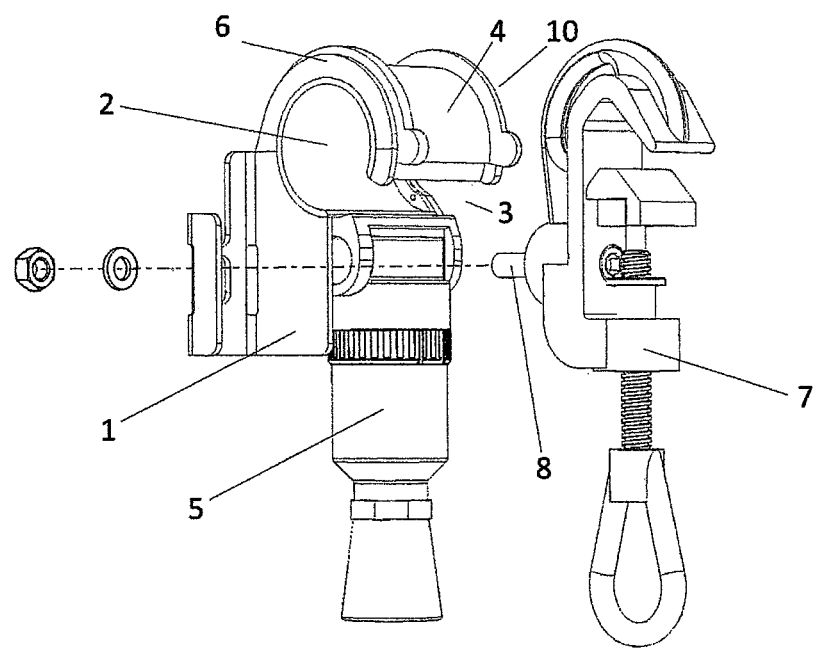
FIG. 2 shows the device with a screw clamp after disassembly.
Figure 3:
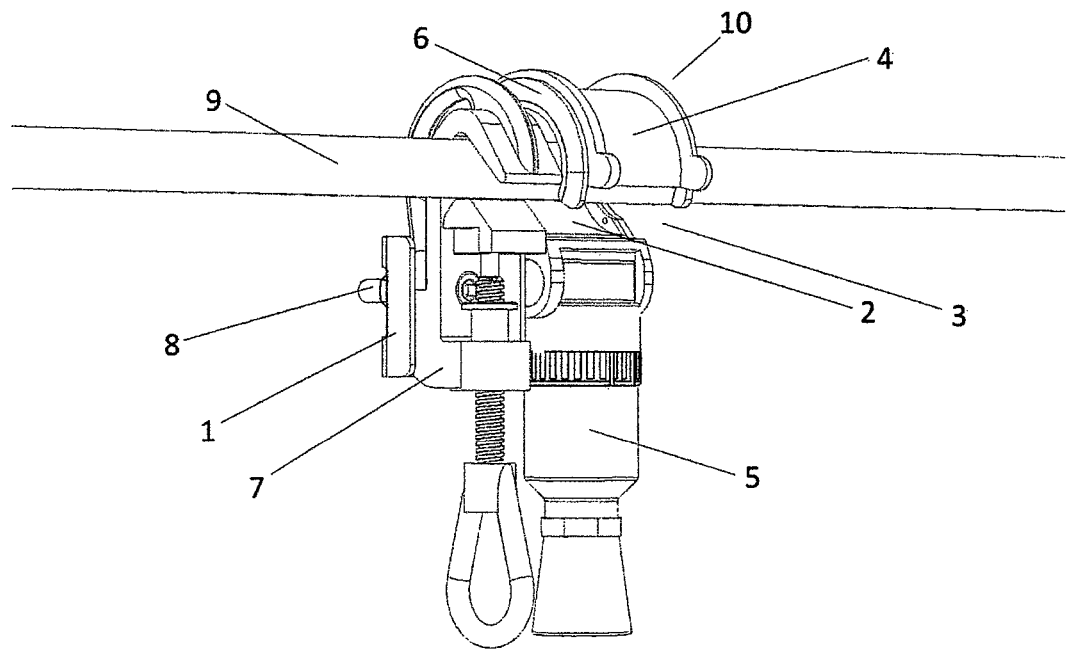
FIG. 3 shows the device with a screw clamp, suspended on the power line in an axonometric view.
Figure 4:
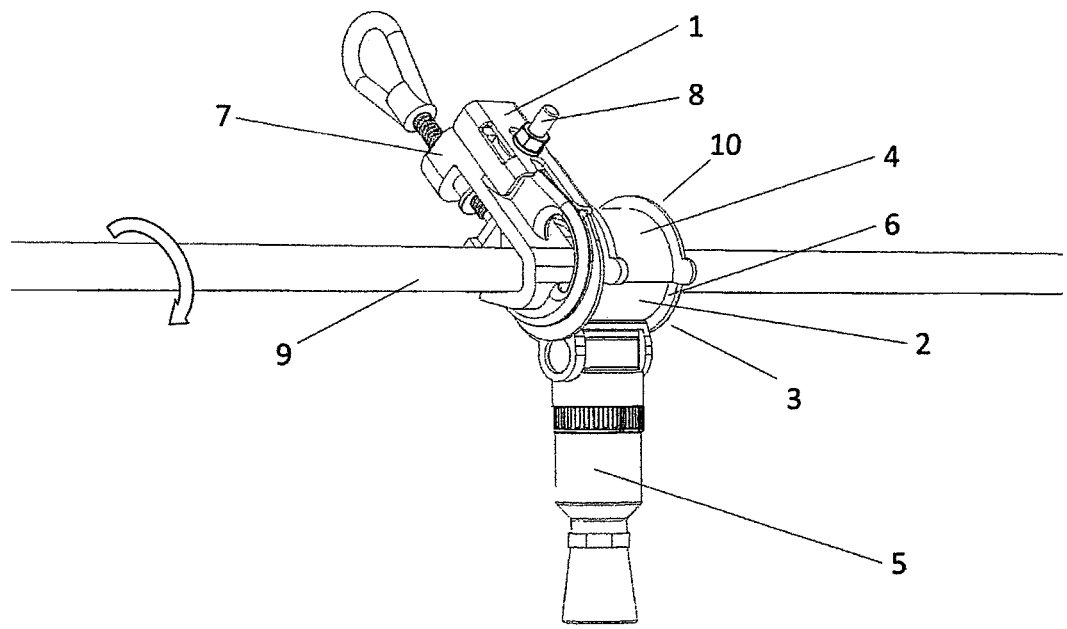
FIG. 4 shows the device with a screw clamp, suspended on the power line, during rotation of the clamp, in an axonometric view.

A fastening element 1 is permanently connected to an inner cylindrical element 2 in which an assembly slot 3 is longitudinally formed. On the inner cylindrical element 2, an outer cylindrical element 4 is permanently pivotally mounted in which a longitudinal assembly slot 3 is also formed. At one of the edges of the longitudinal assembly slot 3 of the outer cylindrical element 4, brackets are formed in which a fixing measuring element 5 is mounted. Along the edge of the inner cylindrical element 2, boundary flanges 6 are formed. Inside the fixing measuring element 5, a socket is formed for mounting the measuring device, for example a distance sensor. A screw clamp 7 is screwed to the fastening element 1 by means of a screw 8. The assembly slots 3 enable free suspension of the device on a power line 9. Having tightened the screw clamp 7, the device is permanently mounted on the power line 9, and the axial rotation of this line causes also axial rotation of the screw clamp 7, which does not affect the position of the fixing measuring element 5 together with the measuring device mounted therein.

EXAMPLE II

The device is made as in Example I, wherein the fixing measuring element 5 is pivotally suspended in the brackets at the edge of the outer cylindrical element 4.

The invention claimed is:

1. A device for mounting an apparatus on an overhead linear object, comprising:
   a swinging element;
   a fastening element permanently connected to the swinging element;
   an inner cylindrical element having an inner longitudinal assembly slot, being permanently connected to the fastening element, and adapted for connecting to the overhead linear object and rotating around an axis thereof;
   an outer cylindrical element having an outer longitudinal assembly slot and permanently pivotally mounted on the inner cylindrical element; and
   a fixing element adapted for fastening to an edge of the outer cylindrical longitudinal assembly slot and having a socket for receiving a measuring device therein and adapted, together with the outer cylindrical element, to remain in vertical position when the inner cylindrical element rotates around the axis of the overhead linear object.

2. The device of claim 1, wherein the socket is longitudinally oriented.

3. The device of claim 1, wherein the fixing element is pivotally fastened to brackets of the outer cylindrical element at one of the edges of the outer cylindrical element longitudinal assembly slot.

4. The device of claim 1, wherein motion limiters in the form of flanges are formed at edges of the inner cylindrical element.

5. A device for mounting an apparatus on an overhead linear object, comprising:
   a swinging element;
   a fastening element permanently connected to the swinging element;
   an inner cylindrical element having an inner longitudinal assembly slot, being permanently connected to the fastening element, and adapted for connecting to the overhead linear object and rotating around an axis thereof;
   an outer cylindrical element having an outer longitudinal assembly slot and permanently pivotally mounted on the inner cylindrical element; and a fixing element adapted for fastening to an edge of the outer cylindrical longitudinal assembly slot, and adapted, together with the outer cylindrical element to remain in vertical position when the inner cylindrical element rotates around the axis of the overhead linear object, wherein the fixing element is a measuring device.

* * * * *